United States Patent [19]

Roveti

[11] 3,774,110
[45] Nov. 20, 1973

[54] STATIC ELECTRIC FIELD DETECTOR
[75] Inventor: Denes Roveti, Annapolis, Md.
[73] Assignee: Daniel Woodhead Inc., Northbrook, Ill.
[22] Filed: Nov. 5, 1971
[21] Appl. No.: 196,083

Related U.S. Application Data
[63] Continuation-in-part of Ser. No. 835,866, May 26, 1969, abandoned.

[52] U.S. Cl. .................................. 324/133, 324/72
[51] Int. Cl. ........................ G01r 19/16, G01r 29/12
[58] Field of Search ...................... 324/52, 67, 133, 324/72, 72.5, 32; 340/258

[56] References Cited
UNITED STATES PATENTS
| | | | |
|---|---|---|---|
| 2,927,269 | 3/1960 | Ecker et al. | 324/72.5 X |
| 3,452,346 | 6/1969 | Kupersmit | 324/72 X |
| 3,204,183 | 8/1965 | Hasenzahl | 324/133 |
| 3,444,465 | 5/1969 | Teixeira | 324/72.5 |
| 3,009,099 | 11/1961 | Muller | 324/52 |
| 3,309,690 | 3/1967 | Moffitt | 324/133 X |
| 3,418,572 | 12/1968 | Humphreys | 324/67 |

Primary Examiner—Gerard R. Strecker
Attorney—William Grobman

[57] ABSTRACT

This apparatus is used to detect the presence of static or alternating electric fields. The electric field intensity is sensed with a probe by proximity capacitance coupling. It comprises an antenna which applies any signal it detects to the input of an amplifier. The output of the amplifier is applied to the input of a threshold circuit which conducts when an input signal of greater than a prescribed value is detected. Conduction of the threshold circuit energizes an oscillator which drives indicators of various types. Once a prescribed threshold level is exceeded, display is activated. Hence, the device of this invention provides a go-no-go presentation of field intensities.

2 Claims, 3 Drawing Figures

INVENTOR.
DENES ROVETI

STATIC ELECTRIC FIELD DETECTOR

This application is a continuation-in-part of my copending application Ser. No. 835,866, filed May 26, 1969 and now abandoned.

This invention relates to detectors, and more particularly to devices for detecting the presence of electrical fields.

Detection of electric fields are well known and widely used, for example, in the radio industry to establish the field intensity in any given location, or for low frequency near field application to establish the field gradient and hence to arrive to the magnitude of the field intensity. Measurement of direct current electric fields such as electrostatic charges is also well known and probably the most ancient version, the gold leaf electrometer, has been used for centuries. While the gold leaf electrometer and the capacitive type electrostatic voltmeter depend on the forces produced by the charge gradient to operate, other prior art types for measuring static fields depend mostly on the vibrating reed principle. The described invention is capable of measuring electrostatic fields simply by moving the pocket size, self-contained instrument in and out or tilting within the field manually or mechanically.

In addition to field strength meters, the prior art contains devices for warning of the presence of strong electrical fields such as those around high-tension lines. Since the fields created by high-tension lines are usually quite strong when they are closely approached, these warning devices do not require great sensitivity. However, most of this type of equipment is designed for safety purposes, and is "fail-safe." This requires additional equipment and raises the cost.

There is a need for a simple, general-purpose device for detecting and measuring the strength of an electrical field. Such a device can be used for many purposes. For example, a detector of the type described which is small, compact, micropowered, and inexpensive, can be used as a pocket device—as the invention is small enough to fit into a shirt pocket. Such a device can be used to signal an unsafe ungrounded equipment or indicate the movement of an intruder, the existence of an unusually large electrical field, dangerous conditions, or even as a toy. For a device to be able to function as described, it must be micropowered and self-contained. To be carried in a shirt pocket or on a helmet for any length of time, the device must be light in weight. In addition, the device must be constructed so that the field probe can withstand rough usage and may operate for over a year without failure and be always on stand-by. In order to perform over the longest possible time interval, the circuit is so designed that it dissipates virtually no electrical energy when it is in the standby condition. Energy is consumed only when a field is detected.

The Electric Field Probe of this invention is a go-no-go monitoring device which readily can be used by non-technical as well as technical personnel to verify safe electrical environmental conditions or to give automatic warning whenever a potentially dangerous situation arises. Its input is completely passive, and under no condition can the probe ever inject any voltage or current into the subject or object being monitored or tested. The unit is completely self-contained and designed so that the normal standby power drain assures virtually the full shelf-life of the single battery.

It is an object of this invention to provide a new and improved electrical field detector.

It is another object of this invention to provide a new and improved electrical field detector which can detect ac and dc fields.

It is a further object of this invention to provide a new and improved electrical field detector which detects steady or variable fields or changes in fields.

It is still another object of this invention to provide a new and improved device for detecting electrical fields, which device is small, self-contained and micropowered for long life, and has a passive input so that it cannot feed any energy back into the circuit being measured.

Other objects and advantages of this invention will become more apparent as the following description proceeds, which description should be considered together with the accompanying drawings in which.

Figure 1:
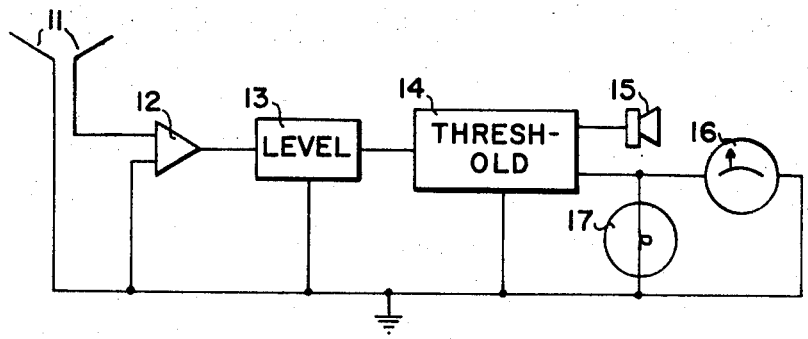
FIG. 1 is a block diagram of the device of this invention.

Referring now to the drawings in detail, and more particularly to FIG. 1, the reference character 11 designates an antenna of the dipole type. One side of the antenna 11 is connected to one input of an amplifier 12, the other input of which is grounded. The output of the amplifier 12 is applied to the input of a level sensor 13, whose output is applied to the input of a threshold device 14. The output of the threshold device 14 is connected to several signal and indicating devices such as the speaker 15, the meter 16, and the lamp 17.

In operation, the antenna 11 is generally nondirectional, although a directional antenna can be used. When the antenna 11 moves in a capacitive field, a voltage is induced in it, and a signal is applied to the input of the amplifier 12. Since the other input to the amplifier 12 is grounded, the resultant input to the amplifier is the signal from the antenna 11 alone. The amplified signal is applied from the output of the amplifier 12 to the input of the level sensor 13 which can comprise a voltage sensitive oscillator, for example. The output frequency of the level sensor is an indication of the amplitude of the input to the amplifier 12, which, in turn, is proportional to the amplitude of the field sensed by the antenna 11. The threshold circuit 14 is really symbolic in FIG. 1, since it can comprise any of several different devices. For example, the threshold device 15 can comprise another amplifier which feeds the output of the level sensor 13 to the speaker 15 in amplified form. The output of the speaker 15 would then indicate by the pitch of the sound the relative amplitude of the field detected by the antenna 11. In this case, the system is more of a warning device than it is a measuring instrument. However, the threshold device 14 can also comprise a frequency detector which is tuneable to the frequency output of the level sensor 13. In this case, the system can indicate, on the meter 16, for example, a measurement of the detected field. The lamp 17 serves as a visual signal or alarm if the speaker 15 is not being used at any time.

The system of FIG. 1 can be used for any of many purposes. An "Executive Toy" is created if the lamp 17 is a small gas tube such as a small neon lamp which is directly connected to the output of the level sensor. The frequency with which the lamp 17 lights is an indication of the charge on the person handling the device—an indication of his "magnetism," or any other attribute desired. Of course, the device merely detects any charge existing on the person who touches it. And the charge may depend upon such things as the grounding at the time, the presence or absence of a rug in the room, even the type of rug used. Or, if the sound transducer alone is used, the system shown in FIG. 1 makes an excellent "voice" for a doll, which seems to cry when it is approached by someone. Again, the sound is created when the charge is detected.

But on a more practical basis, the device of FIG. 1 serves as a sensitive and valuable field detector. With a directional antenna 11, the direction to the electrical field as well as the relative strength of the detected field is indicated. In this manner, the device with the speaker 15 and the lamp 17 serves as an alarm to warn of potentially dangerous conditions, for example, ungrounded medical equipment. The device of FIG. 1 can be used to detect breaks in energized electrical wires imbedded in walls or the like, can be used to detect leakage current of electrical appliances, can be used as a presence detector to detect motion in a closed room. The system shown in FIG. 1 can be used in a multitude of situations. As designed, the system draws current only when a field is detected—at other times, the only current drawn is equivalent to the shelf leakage of the battery. Thus, the device of FIG. 1 can be used in remote and unattended locations.

Figure 2:
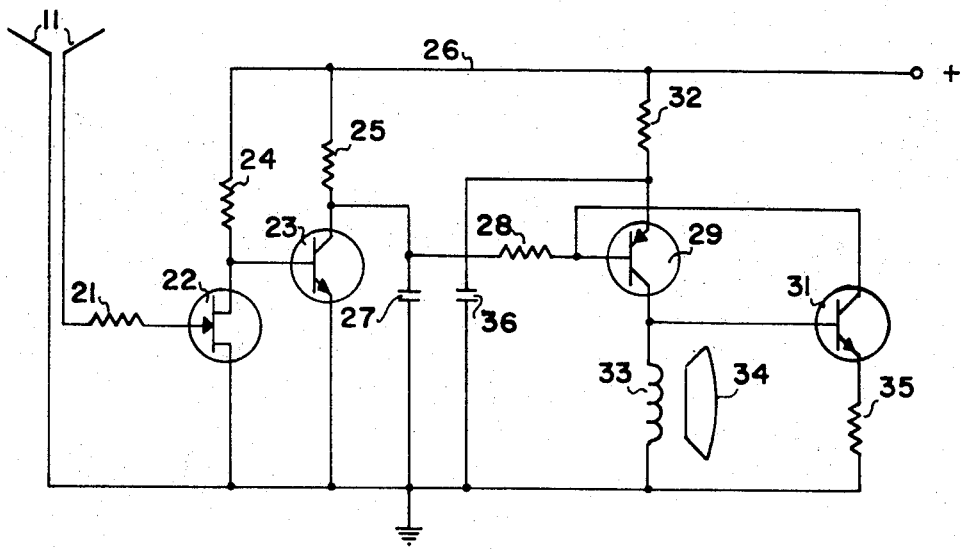
FIG. 2 is a schematic circuit diagram of the device of FIG. 1.

A schematic wiring diagram of one form which the device of FIG. 1 can take is shown in FIG. 2. The antenna 11 is connected on one side to the gate electrode of a field effect transistor 22 through a resistor 21. The source electrode of the transistor 22 is connected to ground, and the drain electrode of the FET 22 is connected through a load resistor 24 to a B+ line 26 which may be connected to any suitable source of electrical energy. The output from the FET 22 is taken from the drain electrode and is applied to the base electrode of a transistor 23 whose emitter electrode is connected to ground and whose collector electrode is connected through a load resistor 25 to the B+ line 26. The output from the transistor 23 is taken from its collector electrode which is also connected to ground through a capacitor 27 and is applied through a resistor 28 to the base electrode of a transistor 29. The collector electrode of the transistor 29 is connected to ground through the voice coil 33 of a speaker 34 (or through some other signal device), and the emitter electrode is connected through a load resistor 32 to the B+ line 26. The speaker coil 33 serves as a load on the transistor 29, and an output is also taken across the coil 33 and is applied to the base electrode of a transistor 31 whose emitter electrode is connected through a load resistor 35 to ground, and whose collector electrode is connected to the base electrode of the transistor 29 in a feedback path. The emitter electrode of the transistor 29 is connected through a capacitor 36 to ground.

In operation, the antenna 11 has a potential induced in it when it enters a changing electrical field or when it moves in a constant field. The potential is applied to the gate electrode of the FET 22 which serves as a high impedance input amplifier. When the antenna 11 acquires a sufficiently negative charge, the FET 22 impedance increases, causing the transistor 23 to conduct. The capacitor 27 is charged by the conducting transistor 23 and tends to smooth out variations in the output from the transistor 23. The two transistor 29 and 31 are connected together in a regenerative oscillator which feeds the voice coil 33 of the speaker 34. Since the two transistors 29 and 31 are of different types, when a signal is amplified by transistor 29 it is also amplified by the transistor 31, and the output from transistor 31 is fed back to the input of the transistor 29. In this way, the signal builds up until oscillation begins.

In another manner, the system of this invention can be used to detect grounded members. For this example assume a normal residence or place of business. If the grounded portion of the antenna 11 is connected through a capacitor to the ungrounded side of a source of commercial electric power, the entire circuit of FIG. 2 is raised to the voltage of that source. As the antenna 11 is moved over the walls or other portions of the building, any grounded member such as the metallic casing of electric conductors, conduits, water pipes, and the like will cause the capacitor to discharge and the antenna 11 to change its potential. This will apply a signal to the FET 22 which stops conducting, turning on transistor 23, and causing the oscillator to oscillate.

In normal use, the FET 22 is the only portion of the circuit to draw current unless an electrical field is detected. Since the impedance of the FET 22 in series with the resistor 24 is high, the current drain on the source is extremely low. This current may be regulated by substituting for the resistor 24 a potentiometer which can be manually adjusted. In the same way, the strength of the field which is detected by the system can be changed to change the instrument's sensitivity. As mentioned above, the instrument of this invention is very versatile; its use being limited only by the breadth of one's imagination. With sensitive and accurate meters connected to its output, the instrument can be used as an accurate field strength meter. With a variable frequency oscillator and sound transducer, the instrument can operate as an alarm, indicating to the person using it when he has strayed too closely to a source of electrical energy. The system of this invention can be placed in a remote location in a warehouse or other safe enclosure and can serve as a presence detector, indicating when the intrusion of a person changes the electrical field in the protected space. In addition, a fixed resistor may be provided across the input terminals to make the unit sensitive to currents in excess of 5 microamperes. This current level was chosen in the light of evidence indicating that currents as small as 20 microamperes may produce ventricular fibrillation (deadly shock) in some cases.

In order to facilitate the use of this invention by even the most nontechnical personnel, the indication of possibly unsafe conditions may be accomplished by a siren-like audible signal which can be monitored either through the built-in speaker or through an accessory earphone.

Further, by suitably grounding the ground terminal of the detector (either with an accessory ground lead or through the body), the unit can be brought near (one to five inches) the object being tested, and if the object has an ac potential with respect to ground, the alarm will sound. This indication may be a sustained, steady siren tone. If the object is supposed to be grounded, the alarm indicates a possible ground fault which can then be corrected.

It is also possible to determine the presence or absence of ac voltage in equipment and in line or power cables where some portion of the energized conductor path is not shielded. For example, it is easy to determine whether or not a line cord or light bulb has voltage on it by merely holding the detector near them (1 to 5 inches). It is impossible for the operating personnel to receive or to generate a hazardous spark since the instrument is not in contact whatsoever with the object or subject being tested.

The detector of this invention has a very high input impedance and, therefore, can rapidly detect the presence or absence of a potentially hazardous electrostatic field. To measure these fields, the detector should be changed from horizontal to vertical position or moved rapidly close to and then away (2 ft/sec approximately; similar to pendulum motion) from the electrostatic field source. For example, if the detector is placed perependicular to the lines of force and then rotated 90° to be parallel with the electrostatic field, a voltage proportional to the field intensity will be induced on the antenna. The alarm will sound if the electric field is above 100 static volts. With minimum training, an operator can easily locate objects or subjects which have either lost their grounding (for example, an operating room cart wheel which has been used on waxed floors and lost its proper conductivity, or a nurse with non-conductive shoes in an operating room), or other potentially hazardous equipment which should be grounded.

In addition, as a go-no-go indicator of static charge build up, leakage current, or as an unsafe equipment ground detector, the detector of this invention provides a valuable device for hospitals, clinics, and the like, to reduce fatalities caused by accidental electrocution.

Figure 3:
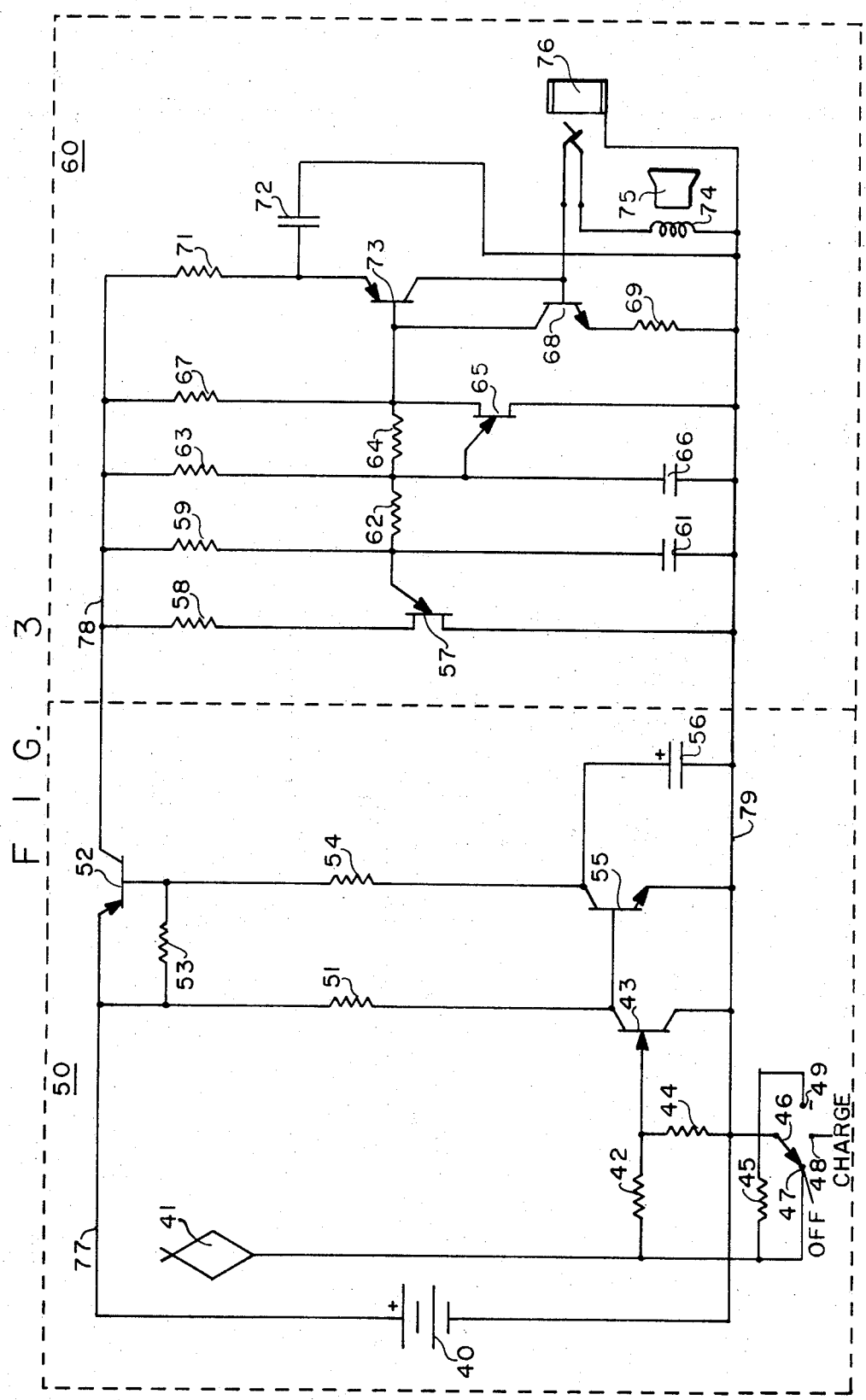
FIG. 3 is a schematic circuit diagram of a second embodiment of the device of this invention.

In FIG. 3, an antenna 41 is connected through a resistor 42 to the gate electrode of a field effect transistor 43. The gate electrode of the transistor 43 is connected through a resistor 44 to a ground lead 79. The source electrode of the transistor 43 is directly connected to the ground lead 79, and the drain electrode of the transistor 43 is connected through a load resistor 51 and line 77 to the positive side of a source of electrical energy such as a battery 40. The negative side of the battery 40 is connected to the ground lead 79. A transistor 52 has its base electrode connected through a resistor 53 to the positive side of the source 40 as is its emitter electrode also. The collector electrode of the transistor 52 is connected to the B+ line 78 of the circuit. The drain electrode of the transistor 43 is also directly connected to the base electrode of a transistor 55 whose collector electrode is connected through a resistor 54 to the base electrode of the transistor 52 and to one side of a capacitor 56, the other side of which is connected to ground 79. The emitter electrode of the transistor 55 is connected to ground 79.

Connected from B+ 78 to ground 79 is the main conduction path of a unijunction transistor 57 whose emitter electrode is connected through a resistor 59 to B+ 78 and through a capacitor 61 to ground 79. The emitter electrode of the transistor 57 is also connected through a resistor 62 to the emitter electrode of another unijunction transistor 65 whose main conduction path is connected in series with a resistor 67 between B+ and ground. The emitter electrode of the transistor 65 is also connected to one side of a capacitor 66, the other side of which is connected to ground. In addition, the emitter electrode of the transistor 65 is connected through a resistor 64 to the collector electrode of a transistor 68, whose emitter electrode is connected through a resistor 69 to ground and whose base electrode is connected to the collector electrode of another transistor 73, which is connected through a jack 76 to one side of a speaker coil 74, the other side of which is connected to ground. The coil 74, when energized, drives a speaker 75. The transistor 73 has its base electrode connected to the collector electrode of the transistor 68 and its emitter electrode connected through a resistor 71 to B+ 78. A capacitor 72 is connected from the emitter electrode of the transistor 73 to ground.

As shown and constructed, the circuit of FIG. 3 can be considered as comprising two parts. The part including the transistors 43, 52, and 55 is the power switch 50, and the part including the transistors 57, 65, 68, and 73 is the load or signal part 60. The source of electrical energy 40 can be any suitable source such as a small dry battery commonly used for transistor radios. In general operation, a switch 46 having three switch positions 47, 48, and 49 is connected to the ground 79. The contact 47 is connected to the bottom end of antenna 41; the contact 48 is not connected to anything, and the contact 49 is connected through a resistor 45 to the antenna 41. When the switch 46 is in the position 47, the unit is OFF since the antenna 41 is grounded. When the switch is in the position 48, the antenna can accummulate a charge in an electrical field. This charge can build to a potential sufficient to terminate conduction through the normally conductive transistor 43. In the position 49, the switch 46 connects the lower end of the antenna 41 through a resistor 45 to ground, permitting the device of FIG. 3 to detect leakage currents. When the switch 46 is in the position 48 and the antenna is extended, the presence of an alternating electrical field, or movement of the device through a static electrical field, causes the antenna 41 to accummulate a charge. The antenna 41 forms one part of a dipole antenna with the circuit and the person holding the portable device forming the other part. The antenna 41 is, preferably, a telescoping antenna which can be extended variable amounts to control the sensitivity of the system. As the antenna moves through the field or enters a varying electrical field, a charge is induced on the antenna 41. This charge leaks off through the resistors 42 and 44 to bias the transistor 43 to pinch off. The impedance of the transistor 43 rises to a high value, reducing the current flow through the resistor 51 and raising the voltage at the base electrode of the transistor 55. This turns on the transistor 55, and the conduction through the transistor 55 establishes a bias through the resistor 54 which causes the transistor 52 to conduct. Conduction of the transistor 52 provides the signal portion 60 of the device with power.

When power is supplied to the transistors 57 and 65, they operate as relaxation oscillators. The application of power to the circuit 60 applies a voltage across the capacitors 61 and 66. As the capacitors 61 and 66 charge, the voltage across them rises until the emitter electrodes of the transistors 57 and 65 are biased sufficiently to cause those transistors to conduct. When the transistors 57 and 65 conduct, they form low impedance paths across the capacitors 61 and 66, and the capacitors discharge therethrough. Since the resistor 59 which is in series with the capacitor 61 and the resistor 63 which is in series with the capacitor 66 are of different values, the rates at which those capacitors charge are different, and the frequencies of the two relaxation oscillators are different. This produces a siren effect which is applied to the base electrode of the power amplifier 73. As the transistor 73 is turned on and off, it, in turn, turns the power amplifier 68 on and off. The current flowing through the transistor 73 is applied through the earphone jack 76 to the coil of the speaker 75 which produces the siren-like sound.

The device of FIG. 3 is a portable field probe which detects and signals the presence of an electrical field. In addition, with the switch 46 is the position 49, and a wire connecting the system ground 79 to an electrical power supply ground, the device of FIG. 3 can detect and signal the presence of actual or possible leakage currents which can cause harm in many sensitive situations such as hospitals and the like. The resistor 45 inserts an impedance between the antenna 41 and ground 79, hence leakage currents can be detected by the transistor 43 as they flow through the resistor 45. The presence of leakage currents biases transistor 43 and to operate in the manner set forth above when detecting electrical fields.

The system of FIG. 3 is divided into two parts with the part 50 serving as a sensitive power switch and the part 60 as a signal generating means. In this respect, the system of FIG. 3 is constructed and operates differently from the system of FIG. 2. The power switch 50 is extremely sensitive, with the two transistors 43 and 55 providing very high gain so that the presence of a weak field is sufficient to bias the power transistor 52 into conduction. With the transistor 52 nonconductive, the drain on the power supply 40 is negligible. With the transistor 52 conductive, the load driven or energized thereby can be of any size the power supply 40 can handle. The two-part system of FIG. 3 provides a simple and effective device which is versatile and sensitive. The power switch 50 can be used to drive any suitable signaling means 60—the siren generator shown and described being but one example. The telescoping antenna provides the system with a simple and inexpensive but effective means for adjusting the sensitivity of the system.

The above specification has described a new and improved electrical field detector and alarm which is small and portable, simple and inexpensive, rugged and long lasting. It is realized that the above description may indicate to other skilled in the art additional ways in which the principles of this invention may be used without departing from its spirit. It is, therefore, intended that this invention be limited only by the scope of the appended claims.

I claim:

1. A portable detector of electrical fields comprising a single antenna adapted to have a voltage induced therein by a changing electrical field, a normally conductive first electronic switch having a first main conductive path and a first control electrode, a first resistor for connecting one end of said antenna to said first control electrode, a multiposition switch having a common contact connected to ground, a second resistor connected to said one end of said antenna and to one contact of said switch, means for directly connecting said one end of said antenna to another contact of said switch so that when said common contact touches said one contact the antenna is connected to ground through said second resistor and when said common contact touches said other contact said antenna is directly connected to ground, a first normally nonconductive transistor having a second control electrode, means for connecting said second control electrode to said first main conductive path, said first main conduction path becoming nonconductive when said common contact touches said other contact and a voltage is induced in said antenna by a changing electrical field and said first transistor becoming conductive when said first main conduction path becomes nonconductive, a second normally nonconductive electronic switch having a third control electrode and a second main conductive path, a source of electrical energy, an oscillator, a power amplifier connected to the output of said oscillator, means for connecting said second main conduction path in series between said source of electrical energy and said oscillator and power amplifier so that said oscillator and said power amplifier are not energized by said source of electrical energy unless said second electronic switch is conductive, means for connecting said third control electrode to said first transistor so that when said first transistor becomes conductive it renders said second electronic switch conductive, and a signalling device connected to the output of said power amplifier to be energized thereby whenever the antenna enters an electrical field of sufficient strength to render said first electronic switch nonconductive.

2. The detector defined in claim 1 wherein said oscillator comprises two separate oscillating circuits having two different frequencies of oscillation, means for connecting said two oscillating circuits in parallel to said second main conduction path so that both oscillating circuits are energized at the same time, and means for connecting the outputs of said two oscillating circuits together to said power amplifier.

* * * * *